US008771526B2

(12) United States Patent
Belford et al.

(10) Patent No.: US 8,771,526 B2
(45) Date of Patent: Jul. 8, 2014

(54) COMPOSITE CONCRETE ARTICLE AND METHOD OF MANUFACTURE THEREOF

(75) Inventors: Patricia Clare Belford, Belfast (GB); Ruth Ellen Morrow, Belfast (GB)

(73) Assignee: University of Ulster, County Londonderry (GB)

(*) Notice: Subject to any disclaimer, the term of this patent is extended or adjusted under 35 U.S.C. 154(b) by 80 days.

(21) Appl. No.: 13/254,576

(22) PCT Filed: Mar. 3, 2010

(86) PCT No.: PCT/EP2010/001311

§ 371 (c)(1), (2), (4) Date: Sep. 27, 2011

(87) PCT Pub. No.: WO2010/099945

PCT Pub. Date: Sep. 10, 2010

(65) Prior Publication Data

US 2012/0189801 A1 Jul. 26, 2012

(30) Foreign Application Priority Data

Mar. 4, 2009 (GB) .................................. 0903678.1
Sep. 1, 2009 (GB) .................................. 0915113.5

(51) Int. Cl.
*B23B 37/00* (2006.01)

(52) U.S. Cl.
USPC .................... 216/7; 216/20; 428/67; 428/194

(58) Field of Classification Search
USPC ............ 216/2, 7, 11, 12, 56, 78, 20; 428/190, 428/192, 193, 255, 67, 194, 312.4
See application file for complete search history.

(56) References Cited

U.S. PATENT DOCUMENTS 4,378,405 A 3/1983 Pilgrim
4,466,860 A * 8/1984 Aggio ............................ 216/83
4,819,395 A * 4/1989 Sugita et al. ............... 52/309.16
6,228,507 B1 * 5/2001 Hahn ......................... 428/542.2

(Continued)

FOREIGN PATENT DOCUMENTS

EP 1818437 A1 8/2007
JP 2001159047 A 6/2001
JP 2002348749 A 12/2002
JP 2003119641 A 4/2003
WO 2010115513 A1 10/2010

OTHER PUBLICATIONS

International Search Report of the International Searching Authority from corresponding Patent Cooperation Treaty (PCT) Application No. PCT/EP2010/001311, mailed Jun. 7, 2010.

(Continued)

*Primary Examiner* — Lan Vinh
(74) *Attorney, Agent, or Firm* — Gardner, Linn, Burkhart & Flory, LLP

(57) ABSTRACT

A method of manufacturing a composite concrete article comprising affixing at least one layer of textile to a base layer and incorporating the base layer into a body of wet uncured concrete such that the base layer becomes embedded in the concrete, whereby at least a portion of the at least one textile layer defines at least a portion of a surface of the cured concrete article with the base layer embedded within the concrete to anchor the textile layer to the concrete.

19 Claims, 2 Drawing Sheets

(56) References Cited

U.S. PATENT DOCUMENTS

| | | | | |
|---|---|---|---|---|
| 7,625,827 | B2 * | 12/2009 | Egan et al. | 442/20 |
| 2004/0084127 | A1 | 5/2004 | Porter | |
| 2004/0142618 | A1 | 7/2004 | Porter | |
| 2004/0152379 | A1 | 8/2004 | McLarty | |
| 2005/0009428 | A1 | 1/2005 | Porter et al. | |
| 2009/0004378 | A1 | 1/2009 | Jones | |
| 2010/0029810 | A1 * | 2/2010 | Pantke et al. | 524/48 |

OTHER PUBLICATIONS

Written Opinion of the International Searching Authority from the corresponding Patent Cooperation Treaty Application No. PCT/EP2010/001311, dated Sep. 4, 2011, which corresponds to U.S. Appl. No. 13/254,576.

Preliminary Amendment filed Sep. 30, 2011, in commonly-assigned U.S. Appl. No. 13/262,347, which corresponds to WO 2010/115513.

* cited by examiner

COMPOSITE CONCRETE ARTICLE AND METHOD OF MANUFACTURE THEREOF

FIELD OF THE INVENTION

This invention relates to a composite concrete article and method of manufacture thereof, and in particular to a concrete article having textile structures integrated into the surface of the concrete to provide a novel aesthetic and/or functional surface finish and to a method of manufacturing such a composite concrete article.

BACKGROUND OF THE INVENTION

Concrete is a composite material that consists essentially of a binding medium within which are embedded particles or fragments of aggregate, usually a combination of fine aggregate and coarse aggregate. In Portland-cement concrete, the binder is a mixture of Portland cement and water, with or without admixtures. Concrete may be reinforced, for example by means of fibres, such as glass fibres, or by metallic wires, rods or mesh, Such reinforcing materials being incorporated into the concrete prior to curing.

Concrete is commonly utilised as a construction material due to its low cost, ease of prefabrication into desired shapes and strength. However, concrete structures have a cold, hard and unattractive surface finish with poor acoustic properties.

Prior art attempts to adhere textile materials to the surface of concrete articles have mainly been focussed on applying or imprinting such materials to the surface of the finished concrete articles. Few attempts have been made to integrate textile materials into concrete articles, mainly due to the harsh environment posed by uncured concrete (highly alkaline) and the difficulty in adhering a textile material to the concrete structure in a manner such that the textile material will not simply peel or scrape off the concrete once it has set or be subsumed by the concrete during the casting process.

SUMMARY OF THE INVENTION

The present invention can be used to improve the appearance, thermal experience, and/or acoustic properties of concrete by integrating textile structures into concrete articles such that at least portions of the textile structures define at least a portion of the exposed surfaces of the articles.

According to the present invention there is provided a method of manufacturing a composite concrete article comprising affixing at least one layer of textile to a base layer and incorporating the base layer into a body of wet uncured concrete such that the base layer becomes embedded in the concrete, whereby at least a portion of the at least one textile layer defines at least a portion of a surface of the cured concrete article with the base layer embedded within the concrete to anchor the textile layer to the concrete.

Preferably the base layer comprises a porous fabric. More preferably the base layer comprises a mesh or apertured sheet or cloth through which the uncured concrete flows. Preferably the base layer comprises a polymeric mesh. In one embodiment the base layer comprises a polyester or nylon mesh. Such mesh may be of the type used for screen printing.

The method may comprise affixing the at least one textile layer to the base layer by means of an adhesive, such as a laminating film.

In one embodiment, the at least one textile layer is bonded to the laminating film before said textile layer is applied to the base layer by means of said laminating film.

A pattern may be formed in the at least one textile layer, for example by means of laser cutting or ablation or a chemical etching process. Where the textile layer is bonded to the base layer via a laminating film, the pattern may be formed after the textile layer has been bonded to the laminating film and before the textile layer has been affixed to the base layer.

Alternatively, or additionally, the method may include the step of forming stitched visual and/or textural effects in the textile layer and/or stitching or bonding additional materials onto the textile layer to create different visual and/or textural effects on the surface of the finished product.

In one embodiment the textile layer comprises a layer of flock adhesively secured to the base layer before the base layer is incorporated into the layer of concrete. Flocking is the application of fine particles, typically nylon fibres, to adhesive coated surfaces. The method may comprise applying adhesive to the base layer, for example by a screen printing process, and applying flock onto the adhesive layer to bond the flock to the base layer, for example by electrostatic spraying of fine particles of flock onto the adhesive layer. The adhesive may be applied to the base layer in a desired pattern, for example by a screen printing process.

In one embodiment the at least one textile layer affixed to the base layer and the resultant laminate is placed in a mould with the textile layer in contact with a face of the mould and uncured concrete is poured into the mould such that the concrete flows into the base layer to anchor the textile layer to the concrete.

The method may comprise affixing two or more textile layers to the base layer. Said two or more layers may be at least partially superimposed upon one another or may be located adjacent each other to form a desired visual and/or textural effect. Said two or more textile layers may be formed from different materials and/or comprise different textures or patterns and/or may be applied to the base layer by two or more different processes.

According to a further aspect of the present invention there is provided a composite concrete article comprising at least one textile layer defining at least a portion of a surface of the article, said at least one textile layer being affixed to a base layer, said base layer being embedded within the concrete to anchor the at least one textile layer to the concrete.

Preferably the base layer comprises a mesh. In one embodiment the base layer comprises a polymeric mesh, in particular a nylon or polyester mesh.

The at least one textile layer may be bonded to the base layer by a suitable adhesive, such as a laminating film.

In one embodiment the at least a portion of the textile layer may comprise flock.

In one embodiment the or at least one of the textile layers may comprise woven linen or any other suitable alkaline resistant textile material.

The textile layer may comprise cut out sections defining a desired visual and/or textural effect in the surface of the finished article.

Stitched patterns may be formed in the textile layer and/or additional materials may be stitched or bonded onto the textile layer or directly to the base layer to create different visual and/or textural effects on the surface of the finished product.

Two or more textile layers may be affixed to the base layer, either at least partially superimposed upon one another or located adjacent one another to form a desired visual and/or textural effect. The two or more textile layers may be formed from different materials and/or comprise different colours and/or textures to create the desired visual and/or textural effect.

BRIEF DESCRIPTION OF THE DRAWINGS

An embodiment of the present invention will now be described, by way of example only, with reference to the accompanying drawings, in which:—

DETAILED DESCRIPTION OF THE PREFERRED EMBODIMENTS

A method of manufacturing a composite concrete article in accordance with an embodiment of the present invention comprises initially bonding one or more textile layers, in this example a layer of woven linen cloth, onto a laminating film by pressing the layers together for around two minutes at a temperature of about 140° C. until the laminating film melts and bonds the layers together. Whilst the described embodiment utilises linen cloth, it is envisaged that numerous and varied textile materials and structures may be used.

A pattern may then be formed in the linen cloth by laser cutting the fabric to remove sections of the fabric to create the desired visual and/or textural effect. Typically a pattern may be created whereby approximately 50% of the original linen material is cut away. The linen cloth is then bonded to base layer comprising a sheet of nylon mesh by means of the laminating film. The mesh may be formed from monofilament nylon, for example formed from Bobbinet Nylon White PW34 having a weight of 136 grams per square metre.

It is envisaged that alternative adhesives may be used to bond the textile layer or layers to the base layer, for example a spray or brush on adhesive may be used instead of a laminating film.

The laminated sheet of fabric (i.e. the linen cloth) and mesh is then placed into a mould, with the fabric layer face down, and uncured concrete is poured into the mould on top of the sheet. The concrete flows into and penetrates the mesh but not the linen attached thereto.

Once cured, the concrete article is removed from the mould. The mesh base layer remains embedded within the concrete while the fabric layer remains on the surface of the concrete to define a surface pattern on the concrete article. The mesh anchors the fabric to the concrete to integrate the fabric layer into the concrete.

Figure 1:
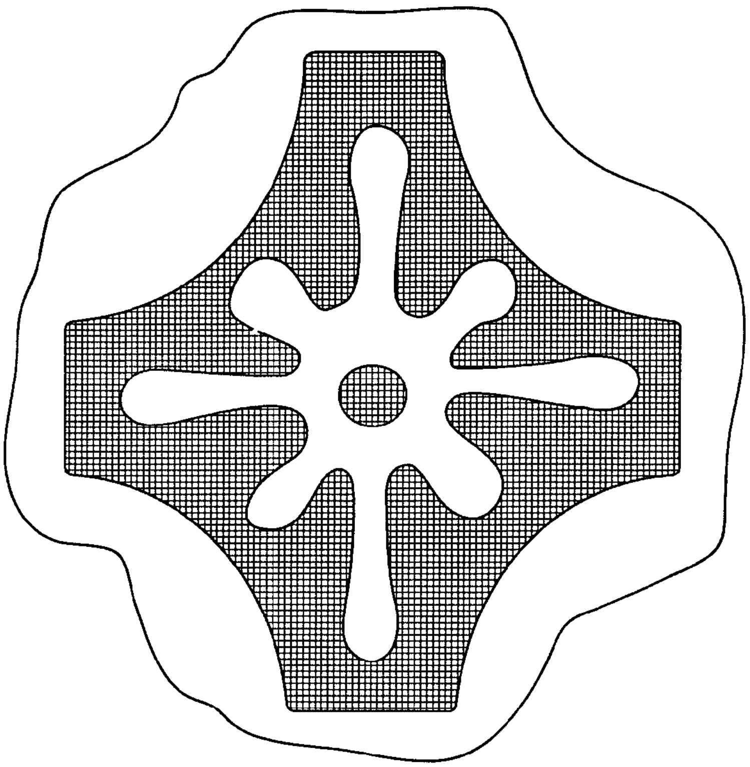
FIG. 1 is a view of a concrete article in accordance with an embodiment of the present invention.

In the embodiment shown in FIG. 1, the linen cloth is cut to define an architectural motif within a border and bonded to a mesh base layer to define a laminated sheet which is then integrated into a concrete panel by placing the laminated sheet within a mould with the linen cloth layer facing downwards and pouring uncured concrete over the laminated sheet. The concrete flows into the base layer such that the base layer becomes embedded with the concrete.

As shown in FIG. 1, the concrete flows through the mesh layer such that the mesh layer becomes embedded within the concrete. In the regions where the linen cloth layer has been cut away, the concrete surface is exposed. However, in the regions where the linen cloth layer remains, the linen cloth remains on the surface of the concrete, forming the desired visual or textural effect.

A wide variety of textile structures having differing patterns, textures and shapes can be integrated into the surface of the concrete, utilising the mesh to anchor the textile material to the concrete. A linen sheet may be affixed to the mesh base layer and a pattern of stitching may be formed on the linen sheet to create a desired decorative effect.

In one embodiment, a sheet of fabric may be anchored to the entire surface of the concrete panel by means of a polyester or nylon mesh base layer, such that the fabric sheet defines the outer surface of the composite concrete panel to provide a construction material with enhanced or specific acoustic properties.

Figure 2:
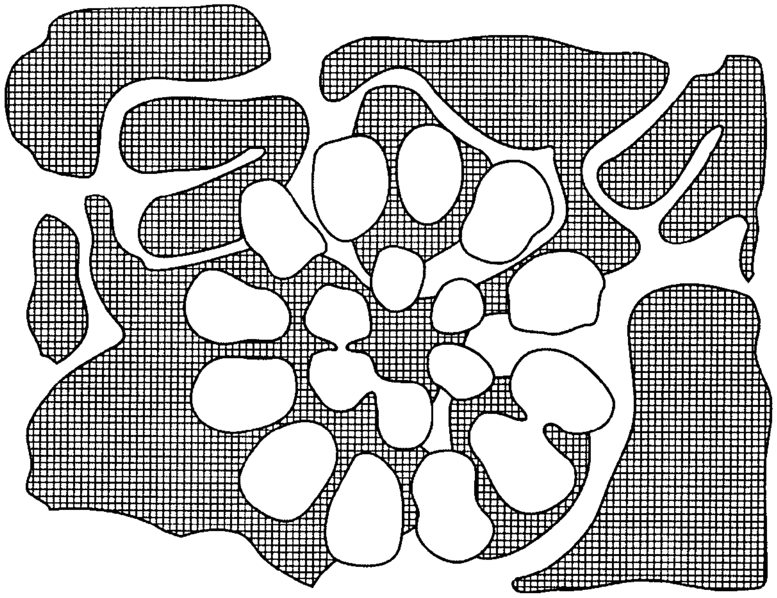
FIG. 2 is a view of a concrete article in accordance with a further embodiment of the present invention.

As shown in FIG. 2, additional visual and textural effects may be created by stitching or bonding further textiles, threads or additional materials onto the at fabric layer.

While woven linen fabric is described in the abovementioned embodiment, other textile materials and structures may be used, provided they are able to withstand the strong alkaline environment of the uncured concrete.

Figure 3:
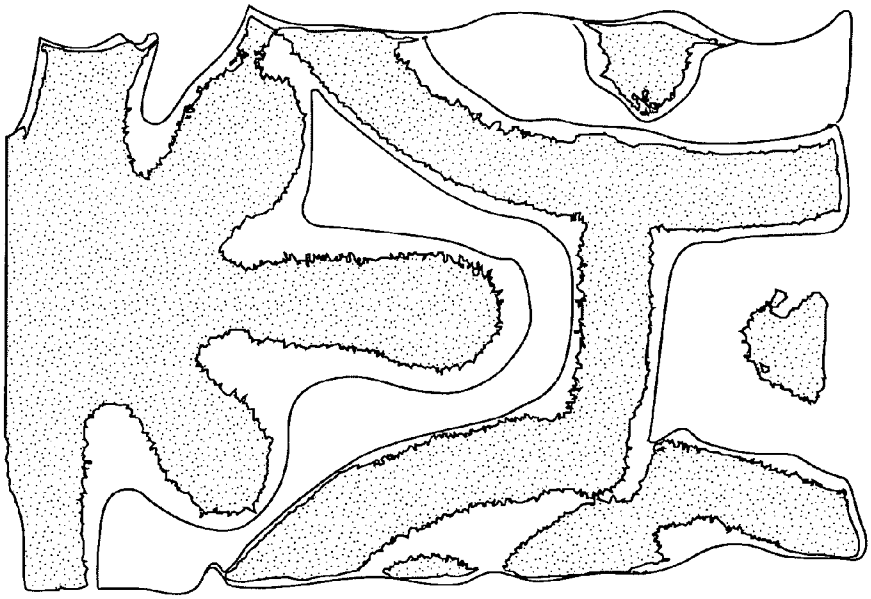
FIG. 3 is a view of a concrete article in accordance with a further embodiment of the present invention.

In a further embodiment, as shown in FIG. 3, a layer of flock, for example nylon fibres, may be applied to a polyester or nylon base layer by a flocking process. The base layer may comprise a polyester mesh having between 5 and 30 threads per cm, more preferably between 10 to 20 threads per cm. A layer of adhesive may be applied to the base layer using a screen printing process before flock is applied to the adhesive using an electrostatic spraying process, as is common in known flocking processes, to achieve a specific pattern of flock on the base layer. A number of layer of different layers or regions of flock, of differing fibre size and/or colour, may be applied to the base layer to create a desired visual and/or textural effect or surface finish.

Once the flocking process has been completed to create the desired fabric layer on the base layer the base later, is then integrated into a concrete panel by placing the base layer within a mould, with the flock layer facing the bottom of the mould, and uncured concrete is poured over the base layer. The concrete flows into the base layer such that the base layer becomes embedded with the concrete with the flock layer forming at least a portion of an external surface of the concrete.

A number of fabric layers, comprising a number of layer or patterns of different colours and/or sizes of flock may be applied to the base layer, and/or a number of woven or stitched fabric layer, to obtain any desired surface finish or visual and/or textural effect upon the surface of the finished concrete article.

The invention is not limited to the embodiment(s) described herein but can be amended or modified without departing from the scope of the present invention.

The invention claimed is:

1. A method of manufacturing a composite concrete article comprising:

affixing at least one layer of textile to a base layer; and incorporating the base layer into a body of wet uncured concrete such that the base layer becomes embedded in the wet uncured concrete, whereby when the concrete is cured to form a cured concrete article, at least a portion of the at least one textile layer defines at least a portion of an exposed surface of the cured concrete article with the base layer at least partially embedded within the concrete to anchor the textile layer to the concrete.

2. A method as claimed in claim 1, wherein the base layer comprises a porous fabric.

3. A method as claimed in claim 1, further comprising the step of forming stitched patterns in the at least one textile layer or stitching or bonding additional materials onto the at least one textile layer to create different visual or textural effects on the surface of the finished product before the base layer is incorporated into the body of wet uncured concrete.

4. A method as claimed claim 1, wherein the at least one textile layer affixed to the base layer form a resultant laminate that is placed in a mould with the textile layer in contact with a face of the mould, and uncured concrete is poured into the mould such that the concrete flows into the base layer to anchor the textile layer to the concrete.

5. A method as claimed in claim 1, wherein the base layer comprises a mesh or apertured sheet or cloth through which the uncured concrete flows.

6. A method as claimed in claim 5, wherein the base layer comprises a polymeric mesh.

7. A method as claimed in claim 6, wherein the base layer comprises a polyester or nylon mesh.

8. A method as claimed in claim 1, wherein the at least one textile layer is affixed to the base layer by means of an adhesive.

9. A method as claimed in claim 8, wherein the at least one textile layer is affixed to the base layer by means of a laminating film.

10. A method as claimed in claim 9, wherein the at least one textile layer is bonded to the laminating film before the textile layer is applied to the base layer by means of the laminating film.

11. A method as claimed in claim 1, wherein a pattern is formed in at least a portion of the at least one textile layer.

12. A method as claimed in claim 11, wherein the pattern is formed by laser cutting or ablation or a chemical etching process.

13. A method as claimed in claim 11, wherein the pattern is formed in the at least one textile layer before the base layer is incorporated into the body of wet uncured concrete.

14. A method as claimed in claim 1, wherein at least a portion of the at least one textile layer comprises a layer of flock adhesively secured to the base layer before the base layer is incorporated into the body of wet uncured concrete.

15. A method as claimed in claim 14, wherein the method comprises applying adhesive to the base layer and applying flock onto the adhesive layer to bond the flock to the base layer by electrostatic spraying of fine particles of flock onto the adhesive layer.

16. A method as claimed in claim 15, wherein the adhesive is applied to the base layer in a particular pattern by a screen printing process.

17. A method as claimed in claim 1, comprising affixing two or more textile layers to the base layer.

18. A method as claimed in claim 17, wherein the two or more textile layers may be at least partially superimposed upon one another or located adjacent each other to form a desired visual or textural effect.

19. A method as claimed in claim 17, wherein the two or more textile layers are formed from different materials, or comprise different textures or patterns, or are applied to the base layer by two or more different processes.

* * * * *